Jan. 5, 1943.  W. H. COLBERT  2,307,568
MIRROR CASE CONSTRUCTION
Filed June 29, 1939   2 Sheets-Sheet 1

INVENTOR
WILLIAM H. COLBERT
BY *Olew E. Bee*
ATTORNEY

Jan. 5, 1943.  W. H. COLBERT  2,307,568
MIRROR CASE CONSTRUCTION
Filed June 29, 1939  2 Sheets-Sheet 2
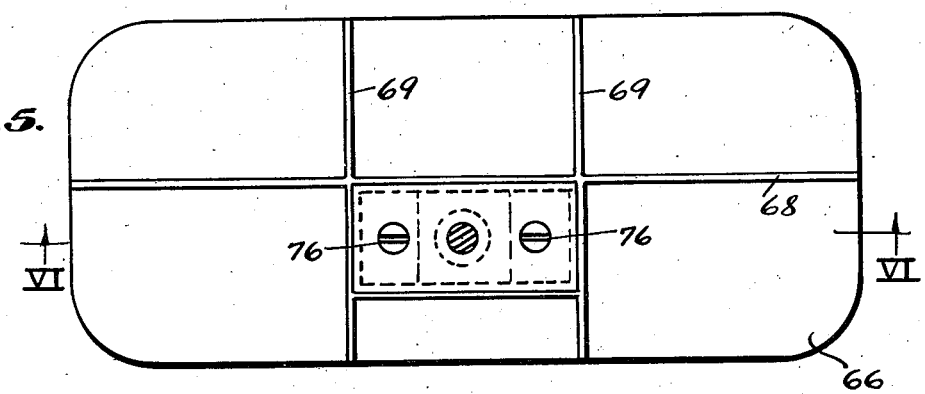
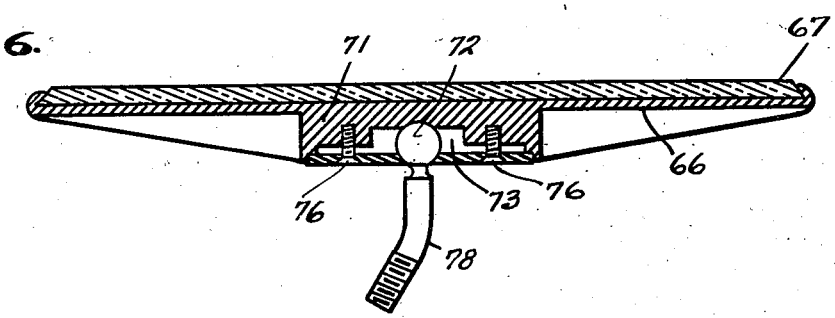
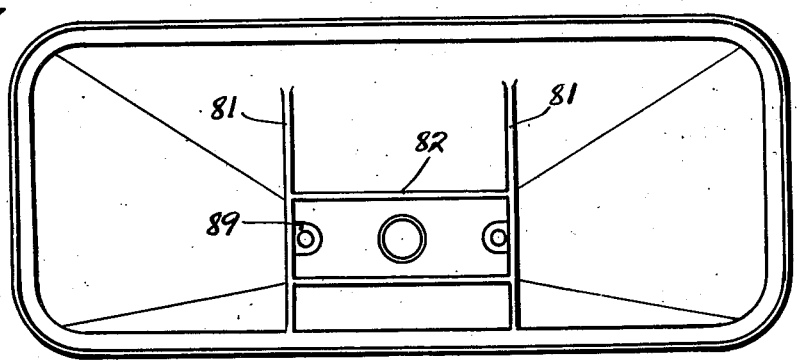
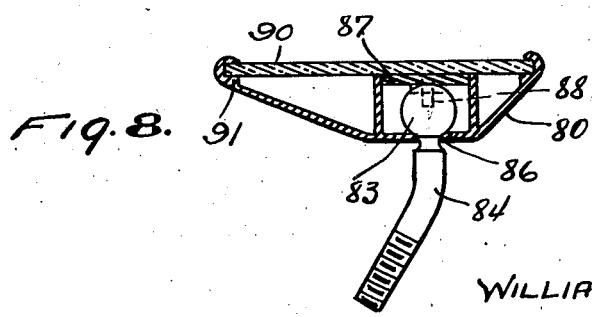
INVENTOR
WILLIAM H. COLBERT
BY Olew E. Bee
ATTORNEY Patented Jan. 5, 1943

2,307,568

UNITED STATES PATENT OFFICE 2,307,568

MIRROR CASE CONSTRUCTION

William H. Colbert, Brackenridge, Pa.

Application June 29, 1939, Serial No. 281,875

4 Claims. (Cl. 88—98)

This invention relates to mirror case constructions and it relates particularly to outside rear view mirrors for vehicles, but it also will find use in inside rear view mirrors for vehicles, and, also, in mirrors for other purposes such as make-up mirrors, advertising mirrors and mirrors for other general purposes.

Such mirrors are generally made of glass, but other materials such as plastics or ceramics may be used.

Mirrors particularly those in outside use are commonly provided with metallic cases or backings, which admit of ready access of moisture or gas ladened air, and quickly deteriorate due to any one or a combination of the following agents: moisture, salt air, gases or temperature changes.

These induce corrosion of the case and deterioration of the silver film which effects are accentuated by galvanic action between the silver and the metal of the case.

The objectionable agents enter the mirror case through openings between the metal case bezel and the mirror, or through openings between the mirror and the metal rolled down on the edges of the mirror, or through the opening between the stud ball generally used to support the mirror and the metal case, or through spacings under screw heads and between the threads of such screws. Moisture, also, condenses inside the metal cases due to changes in temperature, and to the high conductivity of the metal cases even when such metal cases are plated with highly polished metal.

When such mirrors are taken from their metal cases after service in the field great quantities of rust, moisture, and corrosion are found indicating the severity of the action of the agents mentioned.

Attempts to glue the mirror in the case or to apply various backings to the glass, or by use of various types of gaskets, etc., have not solved the problem. They are expensive, and at best have only postponed slightly the failure of the mirroring on the glass. Evidence is the great number of such defective mirrors in use and the great number of such mirrors sold for replacement daily.

Most rear view mirrors are formed of relatively heavy glass, and likewise the metallic backings or cases thereof are relatively heavy. In a modern light weight vehicle, over-all weight limits are attained only by scaling down to a minimum the weight of a large number of component parts and the weight of each part must be kept as low as possible. Adequate scaling down of the weight of conventional heavy mirrors presented a problem. However, a more serious objection to heavy mirrors consisted in the fact that it was hard to attach them sufficiently firmly to obviate a degree of vibration calculated to disturb the vision of the user. This was particularly true in the case of outboard mirrors carried on long out-rigger arms attached to doors, door hinges or the like. Excessive weight, also, made it difficult to maintain the mirrors in desired position or angle of adjustment on the arm.

The present invention involves the formation of the cases of mirrors notably of the rear view type of a light weight readily moldable substance included under the broad designation of "plastics." The following are some of the advantages attained:

Firstly, they are non-conductive to electricity and galvanic cells are not set up between the mirror case and silver, and corrosion of the case and failure of the film can not result.

Secondly, it is relatively easy to mold the plastic about the edge of the glass in such manner as to provide a seal against entrance of moisture. It is also easy to mold into the mirror case mountings for the stud bolts of the mirrors, which are or can readily be sealed, thus providing a hermetically-sealed case.

Thirdly, the heat conductivity of the case is low, practically all tendency of moisture to condense, and the case, or the silvering of the mirror to deteriorate, are overcome.

Fourthly, great advantages, in ease of forming the case into diverse forms and in many attractive and permanent colors, of course, are obtained.

Fifthly, the weight of the plastic case or covering is low and this results in substantial reduction in weight on the mirror arm and a corresponding reduction of vibration of the mirror.

For a better understanding of the invention reference may now be had to the accompanying drawings in which like numerals refer to like parts throughout.

In the drawings,

Figure 1 is a fragmentary perspective view of the left front corner of a conventional automobile showing a mirror constructed in accordance with the principles of the invention mounted exteriorly upon a door hinge.

Figures 2, 3, and 4 are sectional views of different forms of the invention.

Figure 5 is a rear view of a modified form of mirror case.

Figure 6 is a sectional view substantially upon the line VI—VI of Figure 5.

Figure 7 is a view looking at the front of an additional form of mirror case.

Figure 8 is a sectional view of a mirror construction including the casing shown in Figure 7.

Figure 2:
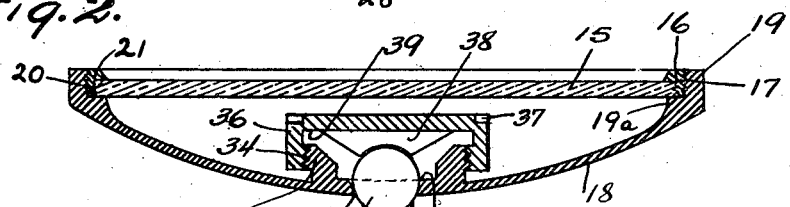

The invention as shown in Figure 2 embodies a mirror plate 15 which may be circular, oval, rectangular, square or of any other convenient outline. The face may be plane as shown, or it may be convex or concave, in order to obtain any desired magnitude in the reflected image. The back of the mirror is coated with a reflective film (not shown) of silver, tin, aluminum, gold, lead sulfide or indeed any suitable reflective material capable of adhering as film to the glass.

The edges of the glass are appropriately roughened or striated as indicated at 16 to provide a tooth for the edge portion 17 of a concave backing element or case 18. The latter is formed of a plastic substance such as phenol-formaldehyde or phenol furfural resin, or resin obtained by condensation of urea and formaldehyde or formaldehyde-forming substance. Other suitable plastics include methyl methacrylate resin, cellulose nitrate, cellulose acetate, polyvinyl acetal resin, copolymers of vinyl acetate and vinyl chloride, hard rubber, gutta-percha, or indeed any other light, strong plastic that can be molded to shape by casting or hot pressing.

Resins, such as urea-formaldehyde, may be admixed while in an intermediate stage of polymerization with wood flour or other filler to provide a so-called molding powder, which is then formed and cured by simultaneous application of heat and pressure to provide finished cases of desired shape.

The edge portions of the case are formed as an upstanding flange or rim 19 and a peripherally-extending shoulder or seat 19a for the edge of the mirror plate is formed at the base thereof. In the finished construction the flange may be moulded about the edge of the glass in such manner as completely to fill the striations 16 and to obtain thorough and intimate contact between the plastic and the glass. The edges may, also, be preliminarily coated with cements of like or compatible plastics, or with gelatine, in order further to improve the bond to the glass. If preferred, however, the inner face of the flange 19 may be threaded as indicated at 20 to receive an externally threaded ring 21 which may act as a clamp to hold the glass 15 in place on seat 19a. The ring, as shown in the drawings, may be preliminarily moulded about the glass to fill striations 16 and thus to provide an effective seal. The threads may be coated with cement to provide in effect a perfect seal between the ring and the flange.

Figure 1:
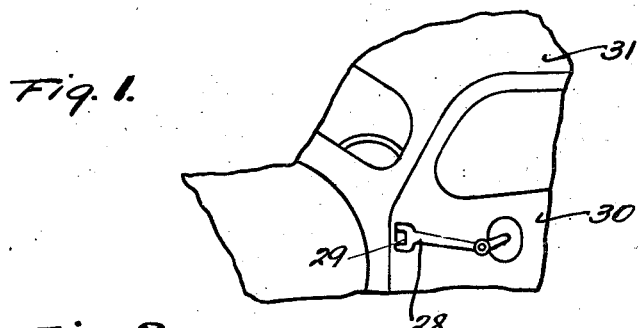

Case 18 preferably is of watch glass or saucer shape and at or near its center is provided with an opening 22, the inner edge of which is tapered to receive an approximately conical lining 23, of metal. The lining provides a bearing for a conventional steel stud ball 24, which has a stem 26 appropriately threaded as indicated at 27 for attachment to a supporting arm, e. g. arm 28, shown in Fig. 1. The arm in turn is attached in conventional manner to an appropriate part, e. g. the hinge 29 of a front door 30, of a car 31.

In order to provide a hermetic seal about stud ball 24, an upstanding flange 33 is formed about opening 22. Screw threads 34 are moulded into the flange to receive a correspondingly threaded cap 36 which may be formed of the same material as the case, or may be formed of brass, steel, or aluminum stamped out to appropriate shape. In order to assist in threading the cap upon flange 33, the former may be appropriately notched as indicated at 37, or otherwise formed to receive a gripping or holding device, such as a wrench or screw driver.

A spring washer 38, of conical shape and having its apex indented to seat upon stud ball 24, is interposed between the bottom 39 of the cap and the ball, and may be formed of resilient steel or brass to assure uniform pressure upon the ball, even after substantial wear. It will be apparent that the washer may constitute the integral bottom of a metal bottle top type cap, properly indented to provide a seat for the ball and to provide resiliently. Such cap could be threaded or simply snapped into position in the same manner as the cap of a soft drink bottle.

In order to insure a hermetic seal between the flange 33 and the cap, the threads of the two may be coated with a cement which will dry to give a practically unitary body, or a rubber washer may be interposed between the cap and the flange.

Figure 3:
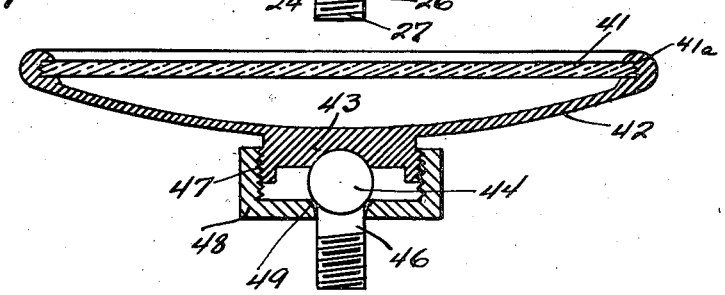

The invention, when constructed as disclosed in Fig. 3, embodies a mirror plate 41 and case or backing element 42 sealed by molding about the edge of the plate to fill striations 41a in the glass. The bottom portion of the case is completely closed and is formed with boss 43 which is provided with a depression to seat a stud wall 44, having an attaching stem 46. The boss is peripherally threaded as indicated at 47 and a cap 48 having an opening 49 for the stem 46 is threaded thereupon. The cap may be milled or formed to admit of gripping with the hand or with a tool to assist in tightening it to grip the ball. Since the bottom of the case is closed, it is completely sealed.

Figure 4:
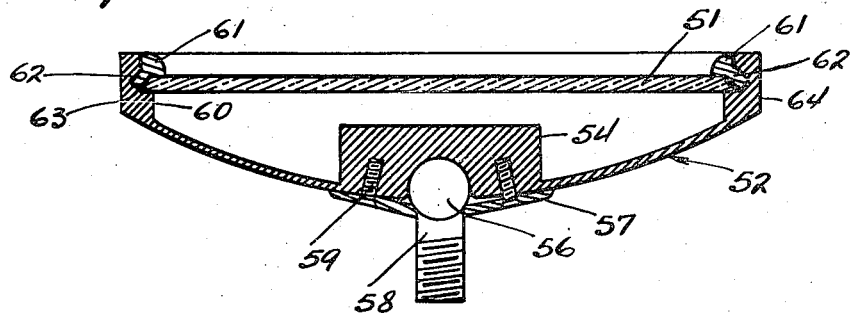

The invention may be constructed, as shown in Fig. 4, to embody a mirror plate 51, a case 52 of molded plastic having a thickened bottom portion suitably depressed as indicated at 54, and a stud ball 56 seated in the depression. The ball is clamped in position by a cover plate 57 of plastic material, brass, aluminum or the like, which preferably is slightly conical and is provided at its apex with an opening to receive the stem 58 of the stud ball. The side walls of the opening are suitably flared to provide a good bearing surface for the ball. The plate is held in position by screws 59 threaded into the plastic.

The mirror plate rests upon a peripheral shoulder 60 in the case and is clamped in position by a bezel-ring 61, which has a lip or flange 62 seating in a groove 63 in the side wall 64 of the case. The ring may be of plastic or other suitable material and may be split to facilitate its insertion. The ends of the inserted ring may be cemented and, similarly, cement may be applied to seal between the glass and the ring and also between the ring and the case.

A form shown in Figs. 5 and 6 embodies a rectangular plate 66 of plastic having its edge moulded about the edge of a mirror plate 67. The plate is relatively thin and light and in order to reinforce it, it is provided upon its back with suitable fins or ribs. One fin 68 may extend longitudinally and two fins 69 may extend transversely. The resultant structure is light of weight, but of exceptional strength.

Between the two fins, a portion of the plate is thickened as indicated at 71, to provide a reinforcement to receive stud ball 72, which seats in a depression 73 in the portion. The ball is maintained in position by clamping plate 14 of resin or other material, which plate is bored to receive fastening screws 76 threaded into the thickened portion. The plate 74 is also formed with opening through which passes the stem 78 of the stud ball 72. Since the mirror back or case is solid and the plastic is sealed about the edge of the glass, no opportunity is afforded for access of moisture to the silver film.

The invention may be constructed as shown in Figs. 7 and 8 to embody a backing shell or case 80, which may be rectangular in outline or of other appropriate shape. The shell is transversely reinforced by two spaced ribs 81, which are disposed internally thereof. These ribs are also interconnected by two longitudinally extending ribs 82, which provide a compartment for reception of stud ball 83, the stem 84 of which extends through opening 86 in the bottom of the case. A cover plate 87 secures the ball in position within the compartment and in turn may be secured by screws 88 threaded into vertical pilaster-like protuberances 89, integral with the ribs 81. The edges of plate 87 may be sealed by cement to prevent entrance of moisture into the case. The mirror plate 90 rests upon a shoulder 91 within the case and the edge is sealed in the same manner as the edges of mirror plate 15 in Fig. 2.

What I claim is:

1. A rear view mirror adapted for use exteriorly of a motor vehicle and comprising a reflector consisting of a plate of glass having a reflective film upon its rear face, which film is sensitive to attack by moisture, galvanic action and the like agencies of deterioration, a backing case for the reflector formed of synthetic plastic and being molded about the edges of the plate to provide a hermetic seal, said case having a thickened portion integrally secured to the back thereof and being formed with a socket for a stud ball, said socket opening rearwardly, a stud ball in the socket, the socket being sealed from the space contiguous to the back of the plate and said space being free of metal adapted to set up galvanic action with the reflective film.

2. A rear view mirror for a motor vehicle comprising a reflector plate of glass having upon its rear face a reflective film which is sensitive to attack by moisture, galvanic action and the like agencies of deterioration, a backing case for the reflector plate formed of plastic material, the plastic material being molded about the edges of the plate to provide a hermetic seal, said case having an opening in the back thereof for the stud of a stud ball, the opening being shaped to provide a seat for a stud ball within the case, a flange within the case disposed about the opening and being integral with the case and providing a cup about the seat for the stud ball and a cap of plastic threaded upon the flange and sealing the stud ball seat from the space about the mirror film, said space contiguous to the film being freed of metals providing an electrolytic couple with the film.

3. A rear view mirror adapted for use exteriorly of a motor vehicle and comprising a reflector consisting of a plate of glass having a reflective film upon its rear face, which film is sensitive to attack by moisture, galvanic action and the like agencies of deterioration, a backing case for the reflector formed of synthetic plastic and being molded about the edges of the plate to provide a hermetic seal, said case having a thickened portion integrally secured to the back thereof and being formed with a socket for a stud ball, said socket opening rearwardly, a stud ball in the socket, the socket being sealed from the space contiguous to the back of the plate and said space being free of metal adapted to set up galvanic action with the reflective film, said thickened portion projecting rearwardly and being screw threaded and a cap threaded thereupon, the cap being formed with an opening therein for a stud upon said stud ball.

4. A rear view mirror adapted for use exteriorly of a motor vehicle and comprising a reflector consisting of a plate of glass having a reflective film upon its rear face, which film is sensitive to attack by moisture, galvanic action and the like agencies of deterioration, a backing case for the reflector formed of synthetic plastic and being molded about the edges of the plate to provide a hermetic seal, said case having a thickened portion integrally secured to the back thereof and being formed with a socket for a stud ball, said socket opening rearwardly, a stud ball in the socket, the socket being sealed from the space contiguous to the back of the plate and said space being free of metal adapted to set up galvanic action with the reflective film, said thickened portion projecting rearwardly and securing means for said stud ball comprising a cover plate secured to the back of the case by means of screws threaded into the thickened portions, said cover plate further being formed with an opening for a stud upon said stud ball.

WILLIAM H. COLBERT.